United States Patent [19]

Hisada et al.

[11] Patent Number: 4,941,719
[45] Date of Patent: Jul. 17, 1990

[54] LIGHT SCANNING SYSTEM

[75] Inventors: Takanori Hisada; Takesuke Maruyama; Masaharu Deguchi; Yoshihiko Noro, all of Yokohama; Yoshifumi Honma, Hitachi; Yoshio Ariki; Shunichi Taguchi, both of Yokohama, all of Japan

[73] Assignee: Hitachi, Ltd., Tokyo, Japan

[21] Appl. No.: 52,884

[22] Filed: May 22, 1987

[30] Foreign Application Priority Data

May 23, 1986 [JP] Japan .................. 61-117227

[51] Int. Cl.$^5$ ............................. G02B 26/10
[52] U.S. Cl. ..................... 350/6.8; 350/6.5
[58] Field of Search ............ 350/6.8, 6.9, 6.5, 6.7

[56] References Cited

U.S. PATENT DOCUMENTS

| | | | |
|---|---|---|---|
| 4,248,495 | 2/1981 | Minoura | 350/6.8 |
| 4,571,035 | 2/1986 | Sakuma | 350/6.8 |
| 4,636,069 | 1/1987 | Balasubramanian | 356/71 |
| 4,639,072 | 1/1987 | Itoh et al. | 350/6.8 |
| 4,687,933 | 8/1987 | Loy | 350/6.8 |
| 4,733,064 | 3/1988 | Ishikawa | 350/6.8 |

FOREIGN PATENT DOCUMENTS

| | | | |
|---|---|---|---|
| 0027646 | 3/1977 | Japan | 350/6.8 |
| 0062615 | 4/1983 | Japan | 350/6.8 |
| 0017714 | 1/1985 | Japan | 350/6.8 |
| 0241012 | 11/1985 | Japan | 350/6.8 |
| 0086723 | 5/1986 | Japan | 350/6.8 |
| 2157845A | 10/1985 | United Kingdom | 350/6.8 |

OTHER PUBLICATIONS

Matsuda et al, "Laser Printer Scanning System with a Parabolic Mirror", Applied Optics, vol. 17, No. 6, Mar. 15, 1978, pp. 878-884.

Primary Examiner—Bruce Y. Arnold
Assistant Examiner—Terry S. Callaghan
Attorney, Agent, or Firm—Antonelli, Terry, Stout & Kraus

[57] ABSTRACT

A light scanning system employing a rotating mirror, spherical lens, and a toric-surfaced reflecting mirror. The toric-surfaced reflecting mirror is disposed in the optical path between the spherical lens and the image plane. The spherical lens sufficiently corrects field curvature and the toric-surfaced reflecting mirror corrects scan nonlinearity. And by the spherical lens and the toric-surfaced reflecting mirror together, the field curvature and the scan nonlinearity are satisfactorily corrected. The toric-surfaced reflecting mirror is surfaced to have a circular arc with a larger radius of curvature in the scan plane and to have a circular arc with a smaller radius of curvature in the cross-scan plane.

1 Claim, 10 Drawing Sheets

FIELD CURVATURE (mm)

FIG. 15b

SCAN NON-LINEARITY (mm)

LIGHT SCANNING SYSTEM

BACKGROUND OF THE INVENTION

The present invention relates to a light scanning system and more particularly to a light scanning system for use in a laser beam printer.

Light scanning systems are disclosed in U.S. Pat. No. 3,750,189 and Japanese Patent Laid-open Nos. 55-15131 and 58-93021. The light scanning systems disclosed in the above mentioned references have an optical system for deflecting a light beam, the angle of deflection normally being $\pm 20°$–$\pm 25°$ or thereabout. In a system in which the angle of deflection is smaller, the space occupied by the optical system becomes larger in order that a larger deflecting distance (the scanning distance by the light beam) is obtained. If the deflecting angle of the light beam is selected to be as large as $\pm 40°$–$\pm 50°$, the optical system can be made smaller. Generally, however, according as a larger deflecting angle is selected, field curvature or scan nonlinearity of the image formed by the optical system becomes larger.

In the light scanning system disclosed in U.S. Pat. No. 3,750,189, for example, a cylindrical lens is disposed between the rotating mirror and image plane so that the field curvature in the scan plane is corrected but the field curvature in the cross-scan plane is increased.

SUMMARY OF THE INVENTION

An object of the present invention is the provision of a light scanning system in which field curvature and scan nonlinearity produced by the light beam in the scan plane and cross-scan plane are reduced.

The light scanning system of the present invention comprises a spherical single lens and a reflecting mirror (a toric-surfaced reflecting mirror) whose curvature is different between the scanning direction and the direction perpendicular thereto. The spherical lens chiefly corrects the field curvature and scan nonlinearity in the scanning direction. The toric-surfaced reflecting mirror corrects residual scan nonlinearity, remaining as such uncorrected by the spherical lens, by the effect of its curvature in the scan plane and at the same time prevents occurrence of wobbling by the effect of its curvature provided also in the direction perpendicular to the scanning direction, a conjugated relationship being thereby provided between the reflecting surface of the deflecting device and the image plane.

At this time, the toric-surfaced reflecting mirror produces virtually no field curvature in the plane orthogonal to the scanning direction.

DETAILED DESCRIPTION OF THE PREFERRED EMBODIMENTS

The system of the present invention will be described in detail according to preferred embodiments thereof in the following.

Figure 1:
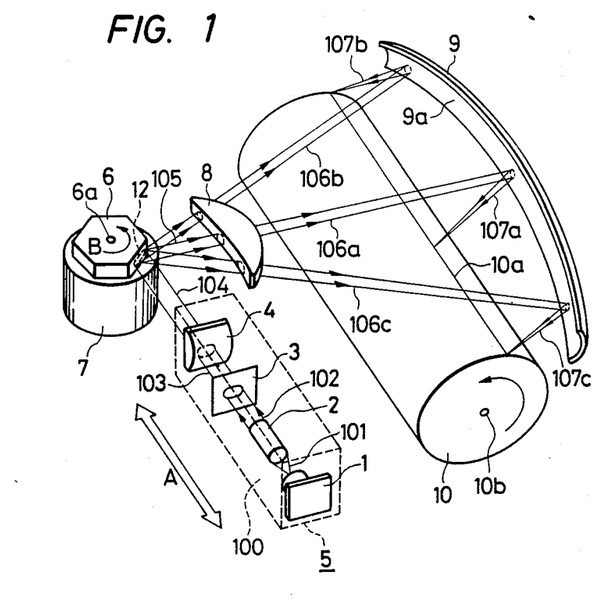
FIG. 1 is a perspective view showing a first embodiment of the light scanning system of the present invention.
Figure 2:
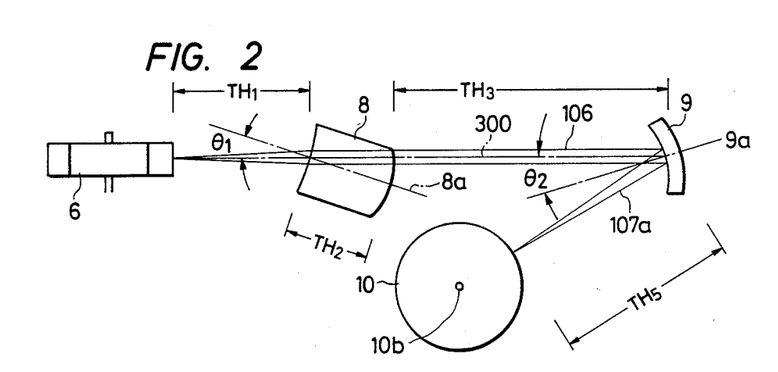
FIG. 2 is a front view of the first embodiment of the present invention.

In FIG. 1 is shown a perspective view of a first embodiment of the present invention, and in FIG. 2 is shown a front view of the portion of the system of the present embodiment from its deflecting device to photosensitive drum.

Construction of the embodiment of the invention will now be described. The system of the present invention comprises a light beam generating portion 5 made up of a light source 1, coupling lens 2, slit 3, and a cylindrical lens 4, a deflecting device 6 coupled to a motor 7 to be driven by the same, a spherical lens 8 having positive power, a reflecting mirror 9 having a toric surface, and a photosensitive drum 10.

The light source 1, coupling lens 2, slit 3, and the cylindrical lens 4 are disposed within a support case 100 and shifted along the optical axis in the directions indicated by the arrow A, supported in the support case.

A light beam 101 diverged from the light source 1 is made into a virtually parallel light beam 102 by means of the coupling lens 2 and introduced into the cylindrical lens 4 through the slit 3. The light beam 104 converged by the cylindrical lens 4 forms a line image on a reflecting surface 12 of the deflecting device 6. Reflected from the reflecting surface 12 of the deflecting device 6, the light beam 105 is passed through the spherical lens 8, then reflected by the toric-surfaced reflecting mirror 9, and converged on a point along a line 10a on the photosensitive drum 10.

The light source 1 is a semiconductor laser, for example, and the beam 101 is emitted from the light source 1 such that the same is diverged therefrom.

The coupling lens 2 collimates the light beam 101 diverged from the light source 1 and generates the virtually parallel light beam 102. The position of the coupling lens 2 in the directions indicated by the arrow is adjusted through a support case 100, whereby focusing of the coupling lens 2 is effected so that beams 107a, 107b, 107c may be converged on the scanning line 10a on the drum 10.

The slit 3 limits width of the beam 102 in the direction perpendicular to the scan plane 300, and according to the limiting of the width and the adjustment of the position of the support case 25, the beam 107 is converged in the plane orthogonal to the scan plane 300 on the scanning line 10a on the photosensitive drum 10.

The scan plane 300 is the plane including light beams 106a, 106b, 106c deflected by the deflecting device 6.

The cylindrical lens 4 having power only in the plane orthogonal to the scan plane 300 converges the light beam 104 to form the line image on the reflecting surface 12 of the deflecting device 6.

The deflecting device 6 is a polygon mirror rotated by the motor 7 at a constant speed in the direction of the arrow B and the light beam 105 is deflected as the angle between the reflecting surface 12 of the deflecting device 6 and the incident beam 104 changes. One scan is made by the light beam 105 during the period that the light beam 104 is incident on one reflecting surface 12, and therefore, scans of the same number as that of the reflecting surface 12 are made by the light beam 105 during the period that the deflecting device 6 makes a full rotation. The overall width of the deflection angle of the light beam 105 in the present embodiment is set to 96°, and therefore, the deflection angle is within ±48° with respect to the light beam 107a incident on the center of the scanning line 10a.

The reflecting surface 12 is arranged in parallel with the rotational axis 6a of the deflecting device 6 and the optical axis of the light source 1, coupling lens 2, and the cylindrical lens 4 is disposed in the plane perpendicular to the rotational axis 6a of the deflecting device 6. And, the scan plane 300 formed as the light beam 105 scans becomes a plane virtually perpendicular to the rotational axis 6a of the deflecting device 6.

The spherical lens 8 has its optical axis 8a taking an attitude virtually in the advancing direction of the light beam 106a and serves to virtually converge the light beam 105 from the deflecting device 6 and to practically correct the curvature of field and scan nonlinearity in the scanning direction.

The optical axis 8a of the spherical lens 8 is disposed, in the scan plane 300, in the direction to agree with the light beam 106a impinging on the center of the scanning range of the scanning line 10a, but the axis is disposed, in the plane orthogonal to the scan plane 300, inclined at a predetermined angle of $\theta_1$ with the scan plane 300 as indicated in FIG. 2. By virtue of such inclined disposal of the optical axis 8a of the spherical lens 8 to the direction perpendicular to the scan plane 300, a bending of the scanning line to be caused by the toric-surfaced reflecting mirror 9 (a bow distortion, i.e., a bending formed of the light beams 107a, 107b, 107c converged on the scanned line 10a) is corrected by the spherical lens 8 as described later on.

Magnitude and direction of the angle $\theta_1$ are determined according to the arrangement of the toric-surfaced reflecting mirror 9. In the present embodiment, the toric-surfaced reflecting mirror 9 is arranged inclined at 15° to the direction as indicated in FIG. 2.

The spherical lens 8 has a form with a convex meniscus on the face toward the toric-surfaced reflecting mirror 9.

Figure 3:
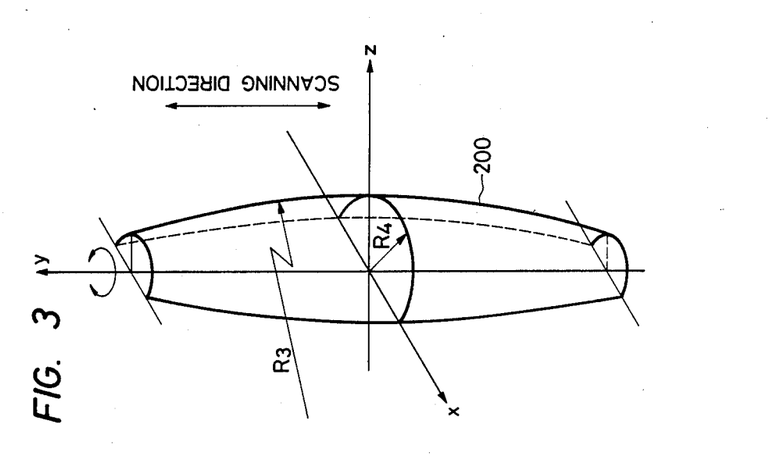
FIG. 3 is a conceptual diagram showing the form of the reflecting surface of the toric-surfaced reflecting mirror for use in the light scanning system of the present invention.

The toric-surfaced reflecting mirror 9 converges further the light beams 106a, 106b, 106c passing through the spherical lens 8 and converges the light beams 107a, 107b, 107c on the scanning line 10a on the photosensitive drum 10. The toric-surfaced reflecting mirror 9 has, on the section cut by the scan plane 300 including the optical axis z, the form of a circular arc 200 having a relatively large radius of curvature $R_3$ as shown in FIG. 3. And the same has a toric surface generated by the circular arc 200 as the generating line rotated about a straight line y as the rotational axis, the straight line y lying on the plane including the circular arc 200 and intersecting the optical axis z at right angles at a distance of $R_4$ smaller than the radius of curvature $R_3$ from the summit of the circular arc on the optical axis z.

The toric-surfaced reflecting mirror 9 corrects the scan nonlinearity that has not been fully corrected by the spherical lens 8, and at the same time, serves to establish an optically conjugated relationship between the reflecting surface 12 of the deflecting device 6 and the scanning line 10a on the photosensitive drum 10 thereby to prevent occurrence of displacement of the light beams 107a, 107b, 107c from the scanning line 10a (wobbling) resulting from a tilt of the reflecting surface 12.

The toric-surfaced reflecting mirror 9 is, as shown in FIG. 2, disposed so that its optical axis 9a is inclined at an angle $\theta_2$ to the direction vertical to the scan plane 300 formed by the light beam 106 incident on the toric-surfaced reflecting mirror 9. By this angle of inclination $\theta_2$, the light beam 107a reflected from the toric-surfaced reflecting mirror 9 is directed to impinge on the photosensitive drum 10. Due to this angle of inclination $\theta_2$, the locus of the light beams 107a, 107b, 107c scanning along the scanning line 10a deviates from a straight line and a bow distortion is thereby produced. However, by virtue of the disposal of the spherical lens 8 at an angle of inclination of $\theta_1$, the bow distortion on the locus can be corrected.

The photosensitive drum 10 made in a cylindrical form is disposed with its rotational axis 10b in parallel with the scan plane 300. The photosensitive drum rotates about the axis 10b, maintains a state electrically charged by the signals of the light beams 107a, 107b, 107c, and transmits the signals to the next stage.

Aberration correcting action by the spherical lens 8 and the toric-surfaced reflecting mirror 9 will now be described.

First, correction of the field curvature and scan nonlinearity in the scanning direction will be described.

Figure 4:
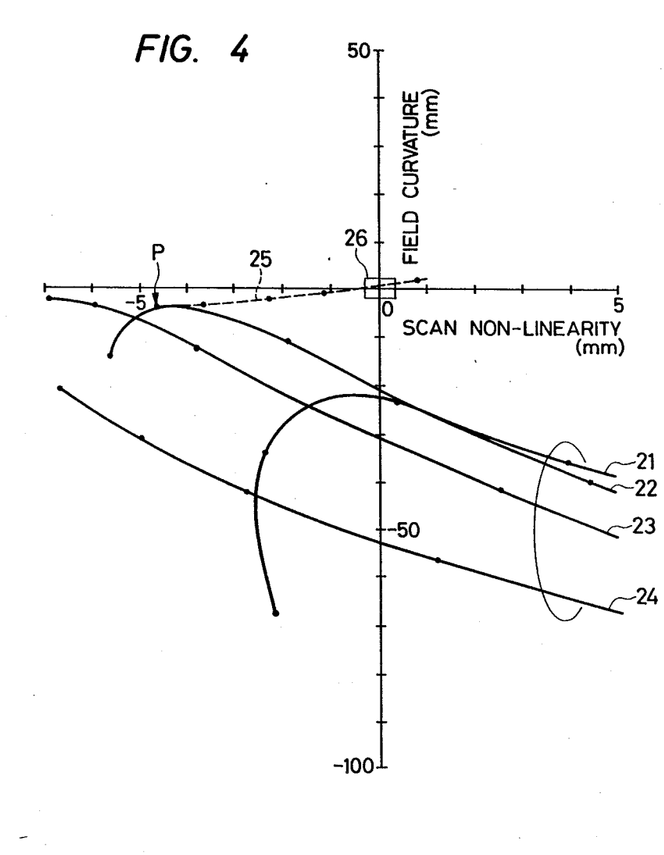
FIG. 4 is a graph showing changes in the field curvature and scan nonlinearity produced by a spherical lens.

In FIG. 4 is shown changes in the field curvature and scan nonlinearity in the scan plane when there is disposed only the spherical lens 8 between the deflecting device 6 and the photosensitive drum 10 and the form of the lens is changed. The ordinates represent magnitudes of the field curvature and the abscissas represent magnitudes of the scan nonlinearity in the scan plane. And, the region 26 enclosed by a small rectangle near the origin of coordinates in FIG. 4 indicates the tolerance of aberration, in which the allowable field curvature is ±2.2 mm and allowable scan nonlinearity is ±0.3 mm.

Referring to FIG. 4, the solid line 21, for example, indicates the locus of the changes in the field curvature and the scan nonlinearity when the power of the spherical lens 8 is constant and the lens 8 is subjected to bending. Thus, the solid lines 21-24 indicate the loci when the power of lenses is set to different values from one another while the lenses 8 are similarly bent.

The bending of the spherical lens 8 is made by changing the curvatures, $C_1$, $C_2$, on both faces of the lens 8 so that the bending coefficient b given by the following formula may be changed, while the power of the lens 8 is kept constant:

$$b = \frac{C_1 + C_2}{C_1 - C_2}. \tag{1}$$

In FIG. 4, the power of the lens 8 is selected to become successively smaller in the order of the solid lines from 21 to 24.

As apparent from FIG. 4, the solid lines 21, 22, 23, 24 never pass through the region of the tolerance 26 and therefore the field curvature and scan nonlinearity cannot be corrected by the spherical lens 8 alone. At this time, the angle of deflection is ±48°.

The broken line 25 in FIG. 4 indicates a characteristic of the system of the present invention when the toric-surfaced reflecting mirror 9 is employed. Namely, the broken line 25 in FIG. 4 indicates the characteristic when the radius of curvature $R_3$ of the toric-surfaced reflecting mirror 9 in the scanning direction is changed. The point P in FIG. 4 represents the case where the radius of curvature $R_3$ is infinity, that is, the toric-surfaced reflecting mirror 9 is made in a cylindrical form, and the field curvature and scan nonlinearity in this case correspond to those in the case where the toric-surfaced reflecting mirror 9 is not employed.

As the radius of curvature $R_3$ is selected to become smaller, the broken line 25 comes closer to the origin. That is, by appropriately setting up the radius of curvature $R_3$ in the scanning direction, the field curvature and scan nonlinearity take the values within the tolerance.

By appropriately changing the radius of curvature $R_3$ of the toric-surfaced reflecting mirror 9, it becomes possible, as shown in FIG. 4, to largely vary practically only the scan nonlinearity. Thus, the scan nonlinearity not corrected only by the spherical lens 8 becomes correctable.

Now, field curvature in the cross-scan plane, that is, deviation of light beams 107a, 107b, 107c from the scanning line 10a will be described. As described above, in order to correct the wobbling of the light beams 107a, 107b, 107c from the scanning line 10a due to the tilt of the reflecting surface 12 of the deflecting device 6, the reflecting surface 12 and the scanning line 10a are placed in the optically conjugated relationship to each other in the plane orthogonal to the scan plane 300, i.e., the plane in the cross-scan direction. The cross-scan direction means the direction perpendicular to the scanning line 10a, on the surface of the drum 10.

In the present invention, by appropriately establishing the radius of curvature $R_4$ of the toric-surfaced reflecting mirror 9, the wobbling due to the tilt of the axis 6a of the deflecting device 6 is corrected.

In the cross-scan plane, the toric-surfaced reflecting mirror 9 has much larger power than the spherical lens 8. Therefore, the field curvature in the cross-scan plane is virtually dependent on the form of the toric-surfaced reflecting mirror 9, not dependent on the spherical lens 8.

The form of the toric-surfaced reflecting mirror 9 is, as shown in FIG. 3, such that the radius of curvature $R_4$ in the cross-scan plane becomes smaller as the position under consideration on the scanning line comes nearer to either end of the scan. Accordingly, the power of the toric-surfaced reflecting mirror 9 in the cross-scan plane becomes stronger according as the position under consideration is nearer to either end of the scan, and in proportion thereto, the converged position of the beam comes nearer to the reflecting surface 9a of the toric-surfaced reflecting mirror 9.

On the other hand, the position of the reflecting surface 9a of the toric-surfaced reflecting mirror 9 is, on account of its form, situated closer to the photosensitive drum 10 as the position under consideration is nearer to either end of the scan.

That is, at both ends of the scan, the converged points of the light beams 107b and 107c come nearer to the reflecting surface 9a but the reflecting plate 9a is situated closer to the photosensitive drum 10, and therefore, the converged points of the light beams 107b and 107c after all lie on the scanning line 10a on the photosensitive drum 10.

Namely, the toric-surfaced reflecting mirror 9 scarcely produces the field curvature in the cross-scan plane.

Figure 5:
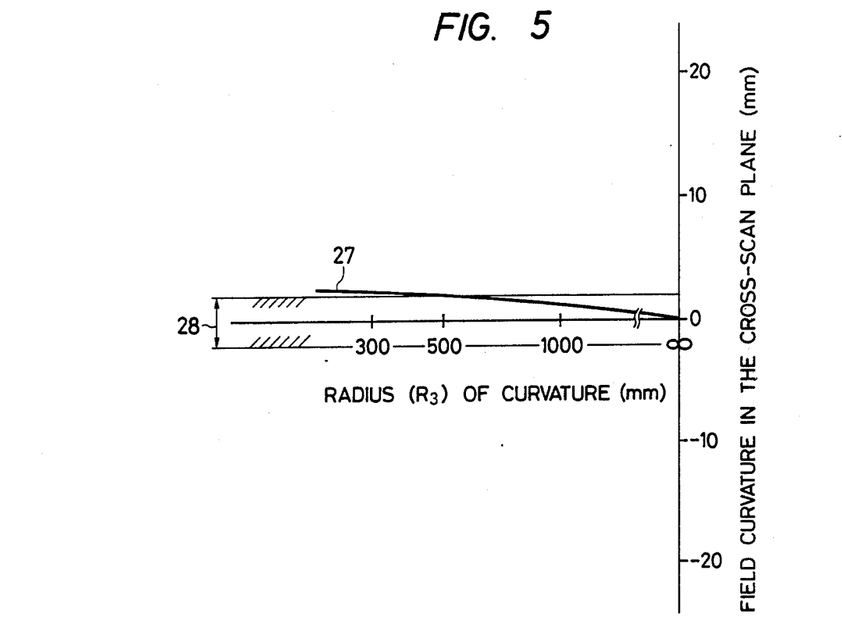
FIG. 5 is a graph showing changes in the field curvature in the cross-scan plane produced by the toric-surfaced reflecting mirror.

FIG. 5 shows changes in field curvature in the cross-scan plane as against the radius of curvature $R_3$ of the toric-surfaced reflecting mirror 9 in the scanning direction.

As apparent from the solid line 27 in FIG. 5, the field curvature in the cross-plane is kept within the tolerance 28 regardless of the curvature $R_3$, in a very wide range of the values of the radius of curvature $R_3$.

The value of the radius of curvature $R_3$ in the cross-scan plane is selected so as to correct only the field curvature and scan nonlinearity in the scan plane, without regard to correction of the field curvature in the cross-scan plane.

The bow distortion of the scanning line 10a will now be described.

In order to cause the light beams 107a, 107b, 107c reflected from the toric-surfaced reflecting mirror 9 to impinge on the photosensitive drum 10, the optical axis 9a of the toric-surfaced reflecting mirror 9 must be inclined at an angle of $\theta_2$ with the scan plane 300 with respect to the light beam 106.

At this time, the locus scanned by the light beams 107a, 107b, 107c on the photosensitive drum 10 forms no straight line, but a bowed curve. If there exists a bow distortion in the scanning line 10a, a line which should be printed as a straight line by a laser printer, for example, becomes a curved line. The tolerance of the bow distortion of the scanning line is said to be within 0.3 mm.

Figure 6:
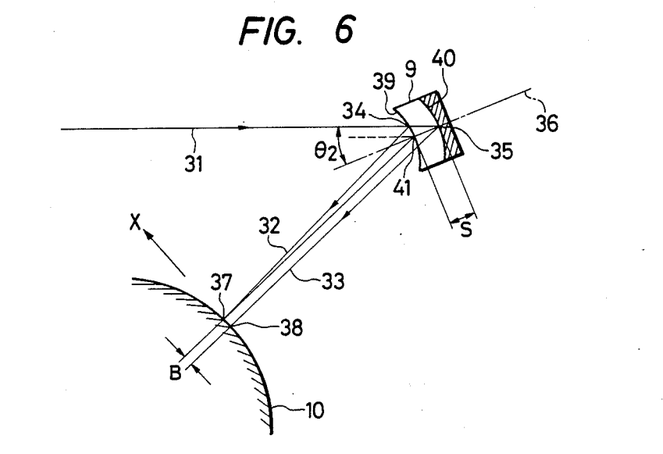
FIG. 6 is a conceptual diagram explaining a factor of generation of bow distortion.

FIG. 6 is a sectional view of the toric-surfaced reflecting mirror 9 and the drum 10 cut by the cross-scan plane and is a conceptual drawing describing why the bow distortion is generated.

The light beam 31 incident on the toric-surfaced reflecting mirror 9 at the center of the scanning range is reflected from the point 35 on the optical axis 36 of the toric-surfaced reflecting mirror 9, and the reflected light beam 33 impinges on the point 38 on the photosensitive drum 10.

At either end of the scan, the beam 31 is reflected from the point 34 a distance S shifted from the point 35 in the direction of the optical axis 36, and the reflected light beam 32 impinges on the point 37 on the photosensitive drum.

The shifted distance S between the points of reflection is produced on account of existence of the radius of curvature $R_3$ of the toric-surfaced reflecting mirror 9 in the scan plane. If the radius of curvature $R_3$ is infinity, the distance $S=0$.

The reflecting surface 39 of the toric-surfaced reflecting mirror 9 at either end of the scan can be regarded as a concave mirror having its focal point located virtually on the surface of the photosensitive drum 10. The light beam 32 reflected from the point 34 impinges on the point 37 which is a distance B apart from the point 38. This distance B is equal to the distance of displacement B of the center 41 of the concave mirror from the point 35 in the direction in parallel with the surface of the photosensitive drum 10, i.e., the direction of X. The value of the distance B is given according to FIG. 6 by $$B = S \sin \theta_2. \qquad (2)$$

The distance B between the point 37 and the point 38 becomes the bow distortion of the scanning line.

The bow distortion of the scanning line 10a can be corrected by changing the angle of incidence $\theta_2$ of the light beam 31 on the toric-surfaced reflecting mirror 9, on the section cut by the cross-scan plane as shown in FIG. 6, according as the point of incidence comes nearer to either end of the scan, and this is achieved by inclining the optical axis 8a of the spherical lens 8 to the cross-scan direction by the angle $\theta_1$ as indicated in FIG. 2.

Figure 7:
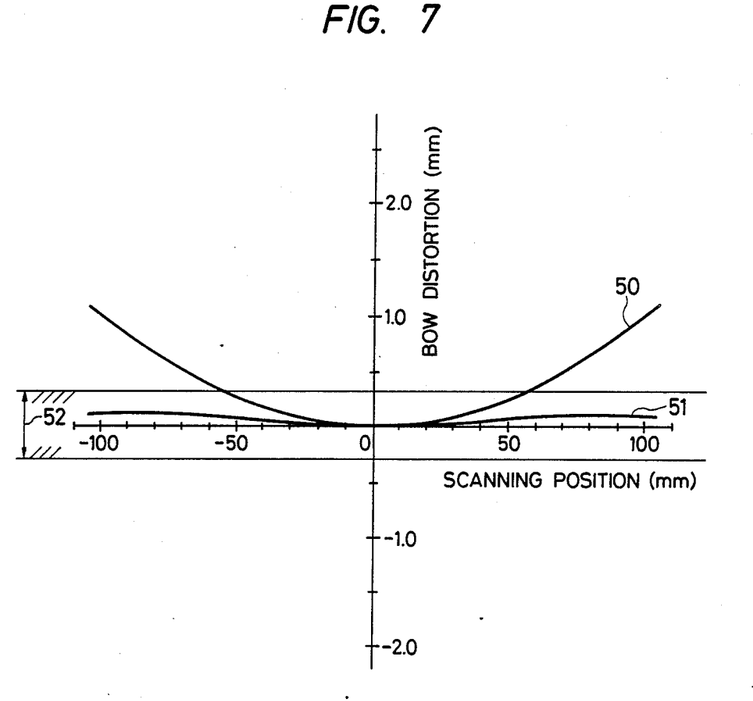
FIG. 7 is a graph showing bow distortion.

FIG. 7 is a graph showing the bow distortion in the system of the present embodiment, in which the axis of abscissas represents the scanning position on the scanning line 10a with the center of the scan taken in the origin and the axis of ordinates represents the bow distortion.

Referring to FIG. 7, while the solid line 50 indicates the bow distortion in the case where the optical axis 8a of the spherical lens 8 is not inclined, the solid line 51 indicates the bow distortion in the case the optical axis 8a of the spherical lens 8 is inclined. The solid line 51 is sufficiently confined within the tolerance 52.

At this time the angle of inclination $\theta_1$ of the optical axis 8a of the spherical lens 8 is set to 15° and the angle of inclination $\theta_2$ of the toric-surfaced reflecting mirror 9 is set to 10°.

Form and disposal of the above described spherical lens 8 and toric-surfaced reflecting mirror 9 are given below:

(1) Spherical lens 8
 a. Radius of curvature $R_1$ (on the side toward the deflecting device 6): 284.9 mm
 b. Radius of curvature $R_2$ (on the side toward the photosensitive drum 10): 64.0 mm
 c. Lens thickness $TH_2$: 17.0 mm
 d. Distance $TH_1$ to the reflecting surface 12: 34.0 mm
 e. Refractive index (wave length 780 nm): 1.51118
 f. Distance $TH_3$ to the toric-surfaced reflecting mirror: 68.1 mm
 g. Angle of inclination of the optical axis 8a: 15.0°
(2) Toric-surfaced reflecting mirror 9
 a. Radius of curvature $R_3$: 776.0 mm
 b. Radius of curvature $R_4$: 93.0 mm
 c. Distance $TH_5$ to the photosensitive drum: 68.5 mm
 d. Angle of inclination $\theta_2$: 10.0°
where the radius of curvature $R_1$–$R_4$ is given positive sign when the concavity is toward the deflecting device 6.

Figure 8A:
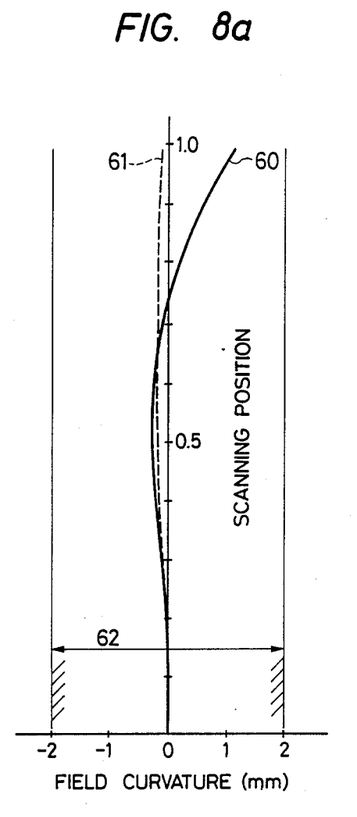
FIGS. 8a and 8b are graphs showing respectively field curvature and scan nonlinearity in the first embodiment of the present invention.
Figure 8B:
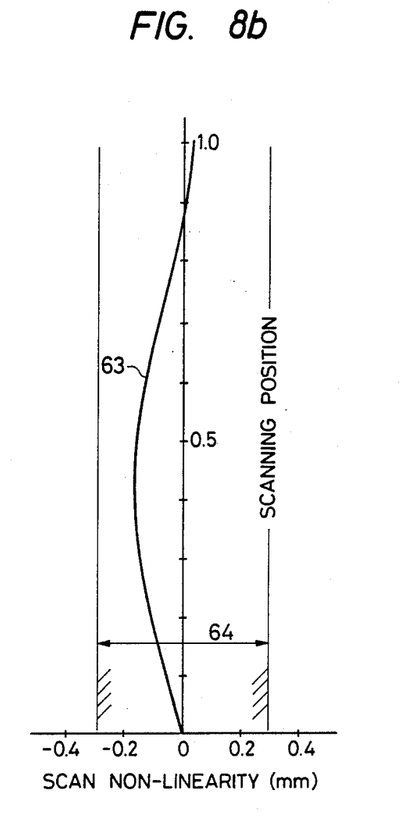

In FIG. 8, characteristics of the field curvature and the scan nonlinearity in the system of the present embodiment are shown. FIG. 8a shows the characteristics of field curvature and FIG. 8b shows the characteristics of scan nonlinearity. Referring to FIG. 8a, the axis of abscissas represents the scanning position in relative value and the origin of coordinates represents the center of the scanning position. At the largest scanning position 1.0, the angle of deflection is ±48° and the scanning width is ±105 mm.

The solid line 60 in FIG. 8a indicates the field curvature in the scan plane and the broken line 61 indicates the field curvature in the cross-scan plane, both being within the tolerance 62.

Referring to FIG. 8b, the axis of abscissas represents the scanning position the same as in FIG. 8a. The solid line 63 in FIG. 8b indicates the scan nonlinearity and this solid line 63 is within the tolerance 64.

As indicated in FIG. 8a and FIG. 8b, both the field curvature and the scan nonlinearity are satisfactorily corrected in the system of the present embodiment, and high performance is obtained from a simple structure.

Figure 9:
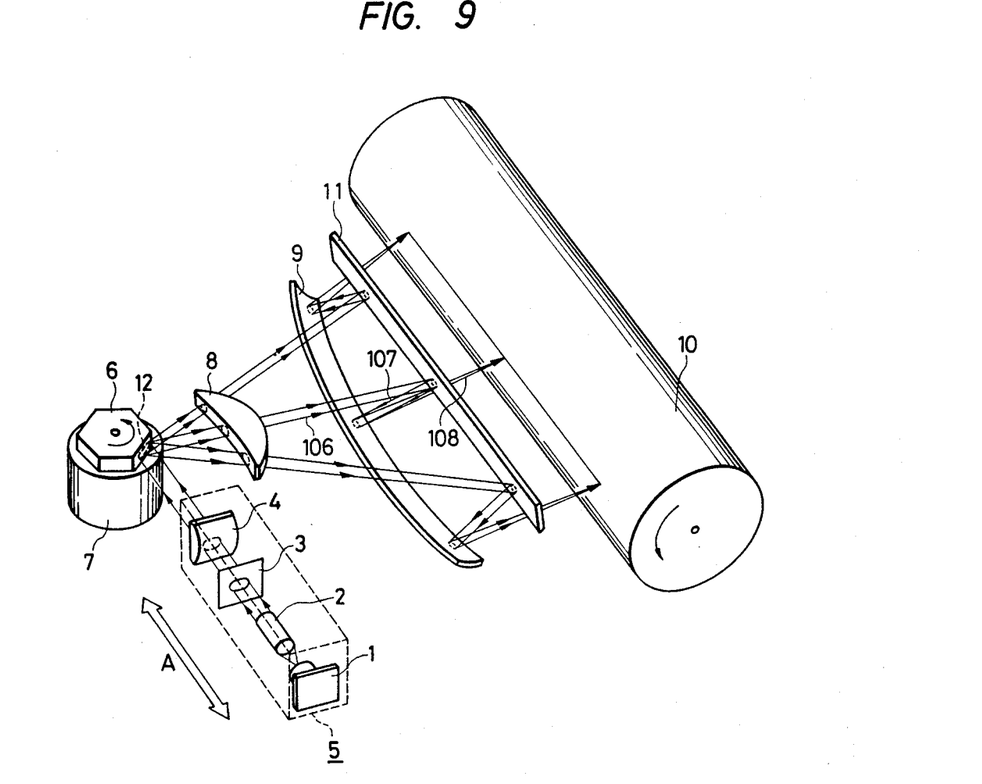
FIG. 9 is a perspective view showing a second embodiment of the light scanning system of the present invention.

A second embodiment of the system of the present invention is shown in FIG. 9.

In the system of the present embodiment, there is provided a plane mirror 11 disposed between the spherical lens 8 and the toric-surfaced reflecting mirror 9.

In the present system, the light beam 106 is introduced into the plane mirror 11 and the reflected light beam 107 from the plane mirror 11 is impinged on the toric-surfaced reflecting mirror 9. In the present system, the light beam 108 reflected from the toric-surfaced reflecting mirror 9 is adapted to impinge on the photosensitive drum 10 from the side thereof, and the overall system is arranged so as to be structured rather compactly.

Figure 10:
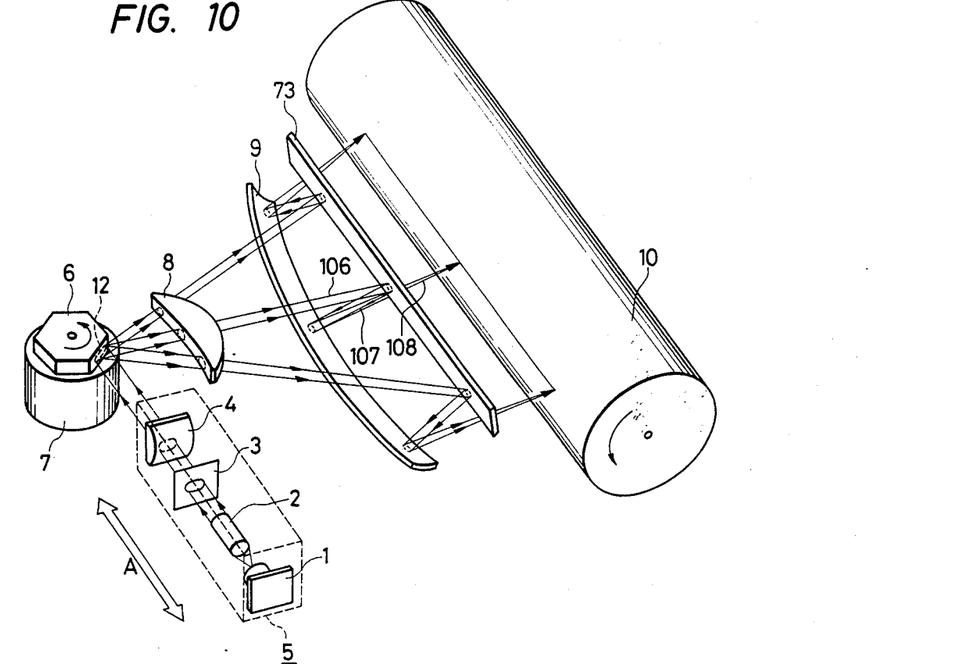
FIG. 10 is a perspective view showing a third embodiment of the light scanning system of the present invention.
Figure 11:
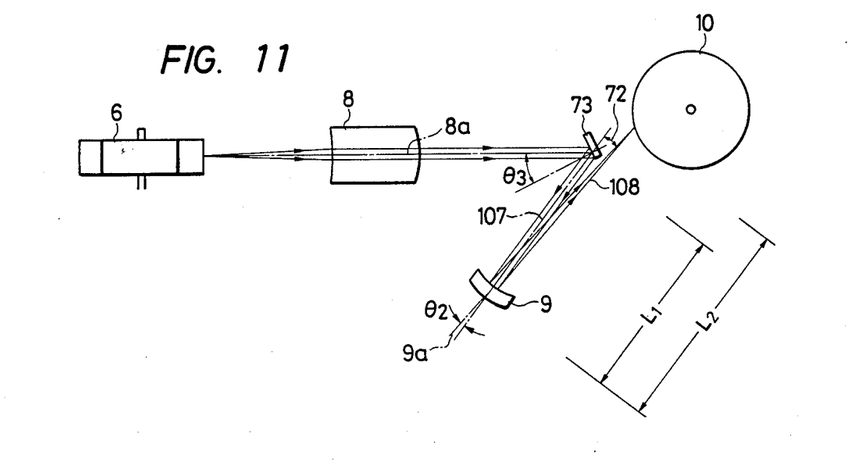
FIG. 11 is a front view of the third embodiment of the present invention.

FIG. 10 shows a general arrangement of a third embodiment of the present invention and FIG. 11 shows a sectional view of the third embodiment. In the present embodiment, the angle of inclination $\theta_2$ of the optical axis 9a of the toric-surfaced reflecting mirror 9 is made smaller, and thereby, the spherical lens 8 is disposed with its optical axis 8a in coincidence with the incident light beam 105 as shown in FIG. 11. And the bow distortion is kept within tolerance.

As described above, the bow distortion of the scanning line is given by the formula (2). As apparent from the formula (2), if the angle of inclination $\theta_2$ of the optical axis 9a of the toric-surfaced reflecting mirror 9 is chosen smaller the bow distortion becomes smaller. The distance S in the formula (2) is obtained from $$S = R_3 - \sqrt{\{R_3^2 - (d/2)^2\}} \qquad (3)$$

where d represents the distance in the scanning direction of the toric-surfaced reflecting mirror 9 and $R_3$ represents the radius of curvature in the scan plane. Therefore, by setting $$-\frac{0.3}{S} < \sin \theta_2 < \frac{0.3}{S},$$

the bow distortion B can be given the value within the tolerance.

In the first embodiment, for example, if the distance S is around 5 mm and the bow distortion B is to be below the allowable value 0.3 mm, the angle of inclination $\theta_2$ must be selected to be about 3° or below. In this case, the angle between the incident light beam 107 on the toric-surfaced reflecting mirror 9 and the reflected light beam 108 therefrom becomes smaller and it becomes difficult to correctly introduce the reflected light beam 108 into the photosensitive drum 10.

However, by making the distance $L_1$ between the plane mirror 73 and the toric-surfaced reflecting mirror 9 sufficiently large as shown in FIG. 11, the reflected beam 108 is enabled to be incident on the photosensitive drum 10 even if the angle of inclination $\theta_2$ ($\theta_2 \neq 0$) of the optical axis 9a of the toric-surfaced reflecting mirror 9 is selected to be less than 3°.

In the third embodiment shown in FIG. 11, the angle of inclination $\theta_2$ of the optical axis 9a of the toric-surfaced reflecting mirror 9 is selected to be 2°, and a. the distance $L_1$ between the plane mirror 73 and the toric-surfaced reflecting mirror 9 is 70 mm, and b. the distance $L_2$ between the toric-surfaced reflecting mirror 9 and the photosensitive drum 10 is 85 mm.

And thereby, the opening 72 between the light beams 107 and 108 becomes 5 mm in the vicinity of the plane mirror 73. As the width of the light beam 108 is approximately 3 mm, the light beam 108 is introduced into the drum 10 without impinging on the plane mirror 73. The bow distortion in the third embodiment is 0.2 mm.

Figure 12A:
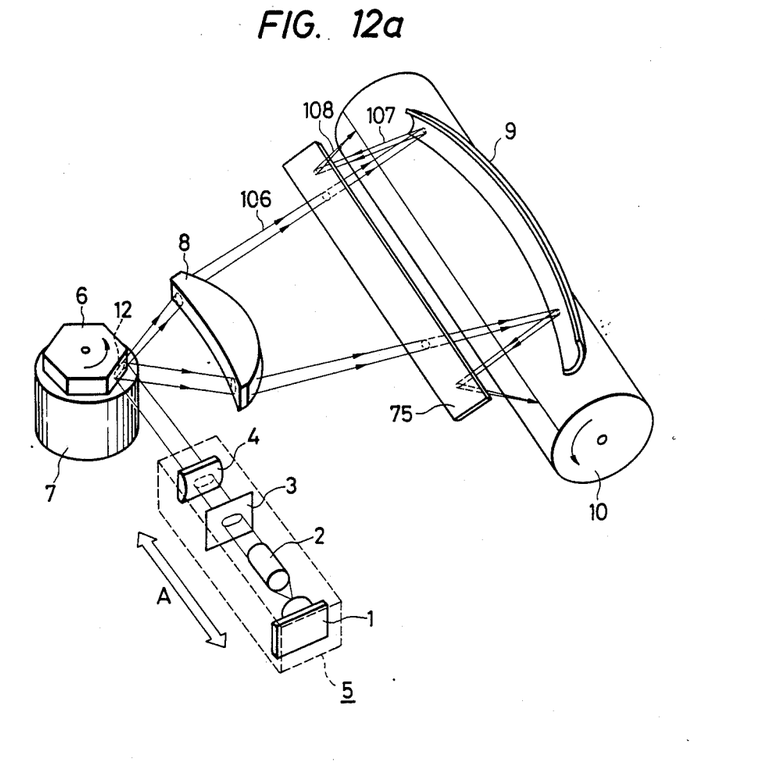
FIG. 12a is a perspective view showing a fourth embodiment of the light scanning system of the present invention.
Figure 12B:
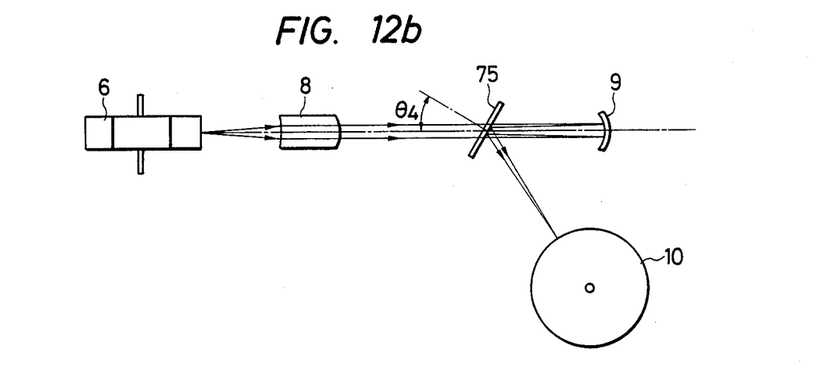
FIG. 12b is a front view of the fourth embodiment.

FIG. 12a and FIG. 12b show arrangement of a fourth embodiment of the present invention.

In the present embodiment, the toric-surfaced reflecting mirror 9 is not inclined, and therefore, there is not produced the bow distortion.

In this embodiment, a semitransparent plane mirror 75 is disposed between the spherical lens 8 and the toric-surfaced reflecting mirror 9, and the beam 106 is transmitted through the plane mirror 75 and introduced into the toric-surfaced reflecting mirror 9. The light beam 107 reflected from the toric-surfaced reflecting mirror 9 is reflected by the plane mirror 75. The reflected beam 107 from the toric-surfaced reflecting mirror 9 in the present embodiment is directed away from the scan plane and then reflected by the semitransparent plane mirror 75 so that the light beam 108 scans the photosensitive drum 10.

The angle $\theta_4$ formed between the reflecting surface of the semitransparent plane mirror 75 and the scan plane is set as $0 < \theta_4 < 90°$.

According to the present embodiment, there is produced no bow distortion, and hence, the spherical lens 8 is not inclined.

Figure 13:
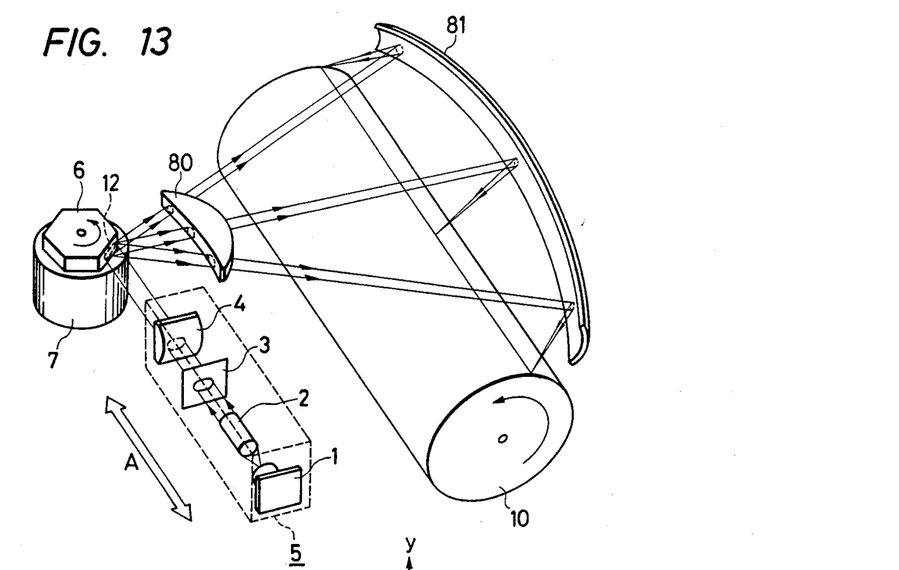
FIG. 13 is a perspective view showing a fifth embodiment of the present invention.

In FIG. 13 is shown construction of a fifth embodiment made up of a reflecting mirror 81 having a toric surface of a form different from that shown in FIG. 3 and a spherical lens 80.

Figure 14:
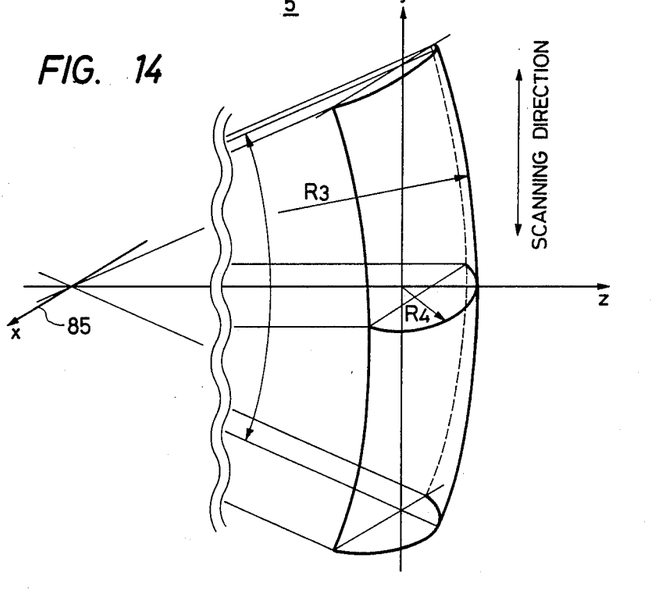
FIG. 14 is a conceptual diagram showing the form of the reflecting surface of the toric-surfaced reflecting mirror for use in the fifth embodiment of the present invention.

FIG. 14 shows the form of the toric-surfaced reflecting mirror 81 for use in the present fifth embodiment. While the toric surface as shown in FIG. 3 has its axis of rotation in parallel with the scanning line and takes, as it were, a barrel form, the toric surface as shown in FIG. 14 has its axis of rotation 85 perpendicular to the scan plane and takes, in a sense, the form of a tire.

Even if the form of the reflecting surface of the toric-surfaced reflecting mirror 81 is as shown in FIG. 14 described above, the field curvature and scan nonlinearity are satisfactorily corrected virtually the same as in the previously described cases.

Form and disposal of the spherical lens 80 and the toric-surfaced reflecting mirror 81 in the present embodiment are given below:

(1) Spherical lens a. Radius of curvature $R_1$ (on the side toward the deflecting device): $-379.2$ mm b. Radius of curvature $R_2$ (on the side toward the photosensitive drum): 195.3 mm c. Lens thickness $TH_2$: 17.0 mm d. Refractive index N (wave length 780 nm): 1.51118 e. Distance $TH_1$ to the deflecting device 6 f. Angle of inclination $\theta$ of the optical axis: 7.8°

(2) Toric-surfaced reflecting mirror 81 a. Radius of curvature $R_3$: 1500 mm b. Radius of curvature $R_4$: 60.1 mm c. Distance $TH_4$ to the photosensitive drum: 40.0 mm d. Angle of inclination to the cross-scan direction: 10°

Figure 15A:
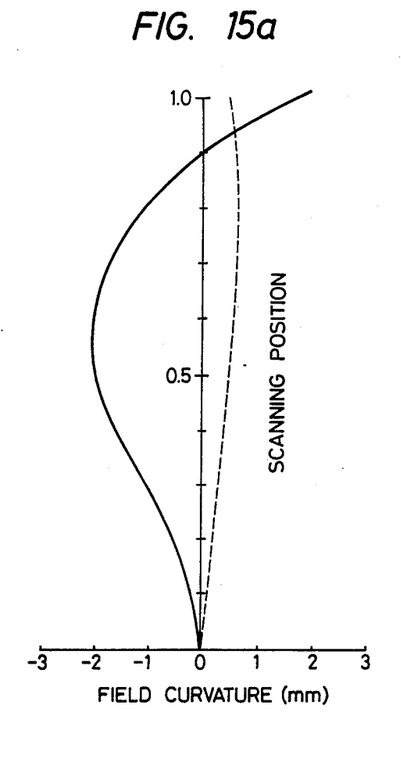
FIG. 15 is a graph showing field curvature and scan nonlinearity in the fifth embodiment of the present invention.
Figure 15B:
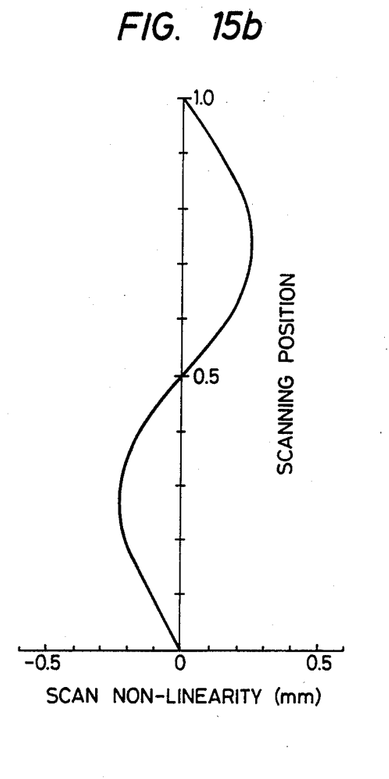

In FIG. 15a and FIG. 15b are shown characteristics of the field curvature and the scan nonlinearity in the fifth embodiment of this invention.

In any embodiment of the present invention, since the toric-surfaced reflecting mirror is disposed in a position relatively close to the photosensitive drum, dimensional errors of the reflecting surface of the toric-surfaced reflecting mirror produce relatively little effect on the system performance. Thus, it is enabled to obtain a satisfactory optical performance even if the toric-surfaced reflecting mirror is formed from plastics by injection molding.

As described so far, although the system according to the present invention is constituted of quite simple component parts such as a spherical lens and a toric-surfaced reflecting mirror, the angle of deflection provided by the system of the present invention is as large as $\pm 48°$ and the length of the optical path from the deflecting device of this invention to the image surface is less than half that in the prior art. Thus, a light scanning system of compact size can be provided.

What is claimed is:

1. A light scanning system for scanning a light beam onto an image surface comprising:

light means for generating a light beam;

light deflecting means having a rotating mirror with a reflecting surface for deflecting an incoming light beam from said light means;

focusing means disposed between said light means and said light deflecting means for focusing the light beam upon said reflecting surface of said rotating mirror of said light deflecting means to a line image;

field curvature correcting means including a single spherical leans provided with a spherical surface and having positive power for focusing the light beam deflected by said light deflecting means onto said image surface, and said spherical lens enabling correction of the field curvature and partial correction of the scan-nonlinearity of an image formed on said image surface;

a first reflecting mirror disposed in the scan plane with its optical axis inclined at an angle of $\theta_3$ ($\theta_3 \neq 0$) with the scan plane for reflecting the light beam passing through said spherical lens;

scan-nonlinearity correcting means including a second reflecting mirror with a toric-surface having a first circular arc with a larger radius of curvature in a first plane which is larger than a second radius curvature in a second plane perpendicular to the first plane, said second reflecting mirror of said scan-nonlinearity correcting means being disposed for reflecting the light beam reflected by said first reflecting mirror and for enabling correction of the scan-nonlinearity of the light beam which is not corrected by said spherical lens and having the toric-surface thereof with a concave shape optically facing said spherical lens, said toric-surface reflecting mirror of said scan-nonlinearity correcting means establishing an optically conjugated relationship between said reflecting surface of said rotating mirror of said light deflecting means and said image surface for preventing of the displacement of the light beam from the scan plane formed by the deflected light beam resulting from a tilt of said first reflecting surface of said rotating mirror of said light deflecting means, and said toric-surface reflecting mirror of said scan-nonlinearity correcting means being disposed with its optical axis inclined at an angle of $\theta_2$ ($\theta_2 \neq 0$) with a scan plane formed by the light beam reflected on said first reflecting mirror, and said $\theta_2$ being defined by the relation:

$$-\frac{0.3}{S} < \sin \theta_2 < \frac{0.3}{S}$$

$$S = R - \sqrt{R^2 - (d/2)^2}$$

where R represents the larger radius of curvature of said toric-surfaced reflecting mirror and d represents the distance in the scanning direction of said toric-surfaced reflecting mirror.

* * * * *